United States Patent [19]
Carlson et al.

[11] Patent Number: 5,430,087
[45] Date of Patent: * Jul. 4, 1995

[54] CARBON BLACK PAIR WITH DIFFERENT PARTICLE SIZE AND IMPROVED RUBBER STOCK

[75] Inventors: Douglas W. Carlson, Kingwood; William D. Breach, Humble, both of Tex.

[73] Assignee: Hydril Company, Houston, Tex.

[ * ] Notice: The portion of the term of this patent subsequent to Mar. 15, 2011 has been disclaimed.

[21] Appl. No.: 116,125

[22] Filed: Sep. 2, 1993

[51] Int. Cl.$^6$ .............................................. C08K 3/00
[52] U.S. Cl. ................................ 524/496; 514/492; 514/493; 514/495; 106/472; 106/475
[58] Field of Search ............... 524/495, 496, 493, 492; 106/472, 475

[56] References Cited

U.S. PATENT DOCUMENTS

| | | | |
|---|---|---|---|
| 3,364,156 | 6/1968 | Kraus | 524/496 |
| 3,761,577 | 9/1973 | Dahmen et al. | 423/450 |
| 4,289,743 | 9/1981 | Ruble | 423/450 |
| 4,431,704 | 2/1984 | Springer | 428/450 |
| 4,756,353 | 7/1988 | Nordsiek et al. | 524/496 |
| 4,786,677 | 11/1988 | Nakai et al. | 524/496 |
| 5,132,357 | 7/1992 | Endter et al. | 524/496 |

OTHER PUBLICATIONS

"Carbon Blacks", Technical Bulletin, Cabot Corporation; (1989).
Carlson, Doug and George C. Derringer, "Computer-Assisted Compounding Methods", *Rubber & Plastic News*, (Mar. 2, 1992) pp. 15–17.
*The Vanderbilt Rubber Handbook*, 13th Ed. (1990) pp. 604–606, 633, 653, 668, 721, 737, 770.
Polysar Book (probably late 1970, early 1980) "Applications for Krynac Oil Resistant Rubbers".
Hycar ® Elastomers "Annular and Ram Blowout Preventer Elements".
Hycar ® Elastomers "Pipe Wiper Elements".
Hycar ® Elastomers "Swab Cubs".
Hycar ® Elastomers "Drill Pipe Protectors".

*Primary Examiner*—Paul R. Michl
*Assistant Examiner*—Edward J. Cain
*Attorney, Agent, or Firm*—Vaden, Eickenroht, Thompson & Feather

[57] ABSTRACT

A carbon black system for manufacturing rubber comprises a pair of carbon blacks having the same structure, a fumed silica and a silane coupler. One of the pairs of carbon blacks has an Iodine Adsorption No. of less than 115 and the other pair of carbon blacks has an Iodine Adsorption No. of greater than 115. A rubber composition comprises a rubber selected from a group of polar and nonpolar rubbers, a carbon black system comprising a pair of furnace carbon blacks with both of the pairs of carbon blacks having the same structure, a fumed silica and silane coupler. One of the pairs of carbon blacks has an Iodine Adsorption No. of less than 115 and the other pair has an Iodine Adsorption No. of greater than 115. The carbon black system is from about 40 parts per hundred to about 80 parts per hundred of the rubber. The ratio of either pair of carbon blacks to the other in the rubber does not exceed 3:1.

11 Claims, No Drawings

CARBON BLACK PAIR WITH DIFFERENT PARTICLE SIZE AND IMPROVED RUBBER STOCK

RELATED APPLICATIONS

The inventors have filed U.S. patent application Ser. No. 08/056,821 entitled "Carbon Black System and Improved Rubber Stock" on May 3, 1993 which is a continuation-in-part of Ser. No. 07/972,623 filed on Nov. 6, 1992 of the same title.

BACKGROUND AND SUMMARY OF THE INVENTION

Carbon black is a form of elemental carbon and it can be produced in varying particle sizes and structures. Structure is the degree of particle coalescence and agglomeration with high structure carbon blacks having more particles agglomerated into random structures than do low structure carbon blacks. Particle size and structure affect various qualities in rubber such as elongation, modulus, tear strength, tensile strength and resilience. Carbon blacks are used with both polar and nonpolar rubbers to enhance these qualities. Rubber stocks containing larger particle blacks display good resilience, but tend to be deficient in tensile strength and elongation. Conversely, rubber stocks containing small particle blacks display good tensile strength and elongation, but have poor resilience qualities. High structure carbon blacks improve the modulus and extrudability of rubber stock. The low structure carbon blacks improve the resilience characteristics of rubber stocks. The carbon blacks in the middle ranges provide stocks that have average characteristics. Manufacturing techniques for carbon blacks have been perfected so that large or small particle carbon blacks with either high or low structure can be prepared.

Carbon blacks are graded by ASTM designation D 1765 standard classification. There are at least four types of carbon blacks, including furnace blacks, lamp blacks, thermal blacks and channel blacks. Furnace blacks are not modified to alter their inherent properties on rubber cure rates. Lamp blacks or lamp black substitutes have modified surfaces that affect the cure rate of rubber. Thermal blacks include very large particle blacks. These blacks are manufactured by incomplete combustion of natural gas. Channel blacks are also produced by incomplete combustion of natural gas. The carbon particles which are intermediate in size, are deposited on steel channels over the flame. The surface of the particle is not altered to affect rubber cure rate. The structure of blacks is defined by the n-Dibutyl Phthalate Absorption number (DBP number) and is measured by the D 2414 test method. The larger the DBP number, the higher the structure. Particle size is defined by Iodine Adsorption Number and is measured by ASTM D 1510 test method. There is an inverse relationship between the iodine number and particle size; the higher the number the smaller the particle.

In manufacturing rubber products a carbon black with certain structure and particle size is used to enhance a certain desired characteristic while sacrificing others. For instance, a large particle black will be used to achieve desired compression characteristics at the expense of tear and modulus. Combinations of carbon blacks with the same size, but different structures have been used together. Using carbon blacks with the same size characteristics limits flexibility in varying qualities in the rubber products. However, utilizing carbon blacks with different sizes has generally been avoided, because mixtures of different particle sizes of carbon blacks are deemed incompatible.

A rubber products manufacturer uses different size and structure carbon blacks to produce goods with varying characteristics. Even so, utilizing one type of carbon black or pairs matched for size, limits the qualities achieved in the rubber, because of the enhancement of certain qualities is detrimental to others. Recommended formulations for transmission belting for engines, hydraulic hose tubes and wire and cable jackets include mixtures of large particle carbon blacks to provide desired compression characteristics. *The Vanderbilt Rubber Handbook*, R. T. Vanderbilt Co., Inc.; Norwalk, Conn.; 13th Ed. (1990) pp. 653, 721. Other formulations for high hardness rubber mix furnace blacks with large particle thermal blacks. Id. at 770. Typical formulations for seals include a matched pair of large particle carbon blacks with high and low structure. Id. at 737. Mixtures of carbon blacks with similar size and structure are used in some applications. For example, two large particle and low structure carbon blacks have been recommended for a tire body formulation. Id. at 606. Tire treads, on the other hand, contain small particle carbon blacks. Id. at 604, 605. The large particle and low structure is desired for resilience qualities in the tire body. The tread utilizes small particles with better tensile strength.

The present invention is a unique pairing of furnace carbon blacks with disparate qualities to provide a system that can be manipulated to produce rubber with balanced optimum qualities. Specifically, the carbon black pair system is a mixture of two furnace carbon blacks. The pairs are matched according to structure, but have different particle size. Typically, carbon black pairs are matched by size and the present invention is contrary to traditional teaching. One of the pair of carbon blacks has an Iodine Adsorption Number of greater than 115 and the other has an Iodine Adsorption Number of less than 115. The carbon black pairs have the same structure. For the invention, structure is defined as high structure for particles with a DBP number of greater than 110 and low structure for particles with a DBP number of less than 110. Therefore, both carbon blacks in the pair will have either high or low structure based on the 110 DBP number cutoff.

The two carbon blacks are used together with the ratio of one to another generally not to exceed 3:1. The ratio is varied according to the qualities desired. The use of the carbon black pairs of this invention mixed with rubber stock has produced an improved rubber product with good compression and resilience characteristics generally attributed to the use of large carbon black particles in a rubber while retaining the good elongation, modulus, tear and tensile strength attributable to the presence of small carbon black particles. The use of the unique carbon black pairs can produce a rubber composition with a combination of the optimum qualities of the large and small particles.

The carbon black pair system also includes, in combination with the carbon black pairs, a fumed silica and silane coupler. Fumed silica has a much smaller particle size than precipitated silica that is also used in rubber processing. Silica increases tear strength. Fumed silica is very expensive and builds viscosity in the rubber. A silane coupler is also used with the carbon black pair.

Silane couplers used in conjunction with silica decrease elongation, but sometimes can produce excessively high modulus elongation. Silane couplers are used in ranges known to those skilled in the art with the fumed silica. A typical ratio is 10:1 fumed silica to silane coupler. The fumed silica is used generally in a 12.5% to 50% by weight to the combined weight of the carbon black pair.

The carbon blacks can be selected according to the parameters of this invention to maximize the desired properties of polar and nonpolar rubbers. The use of the unique carbon black pairs with silica/silane system allows the manufacturer to maintain a minimal stock of carbon blacks and produce rubber products with a range of qualities. The unique carbon black pairs eliminate the need to maintain a wide range of different size and structure carbon blacks for manufacturing purposes.

The use of the carbon black pairs with a fumed silica and silane coupler produces unique rubber compositions. The carbon black system is mixed with the selected rubber stock and cured. The carbon black mixture comprises from about 40 parts per hundred to about 80 parts per hundred of the selected rubber. The rubber compositions, both polar and nonpolar rubber, have as the carbon black constituent with high or low structure carbon blacks with DBP numbers greater than and less than 110 respectively, and a mixture of large and small particle carbon blacks with Iodine Adsorption Numbers of less than and greater than 115. The use of the new carbon black pair produces a new rubber composition as described herein.

Carbon blacks are given an ASTM designation with the letter "N" used to indicate typical furnace blacks that receive no special surface modification to alter their influence on the rate of cure. The second character in the nomenclature is a digit to designate particle size with lower digits indicating smaller particles. The third and fourth characters are assigned arbitrarily, however the full designation of each of the carbon blacks assigned by the ASTM describes the carbon black as to particle size and the structure. For example, one of the pairs with different particle sizes and low structure is ASTM D1765 designations N231 a small particle (121 Iodine Adsorption No.) and low structure (DBP No. 92) and N774 a large particle (29 Iodine Adsorption No.) and low structure (DBP No. 72). By varying the amount of N231 and N774 within the range of 3 parts N231 to 1 part N774 or 1 part N231 to 3 parts N774, rubber stocks can be provided with varying characteristics in acceptable ranges for different rubber products. Another pair with different particle size and high structure is N234 a small particle (120 Iodine Adsorption No.) and high structure (DBP No. 125) and N550 a large particle (43 Iodine Adsorption No.) and high structure (DBP No. 121). Accordingly, the rubber products manufacturer can stock a limited number of carbon blacks and produce a variety of rubber stocks.

Detailed Description of the Invention

The carbon black pair is a mixture of two furnace carbon blacks with the same structure having DBP Nos. of greater than or less than 110. The pair is mismatched as to size. One of the pairs is a large particle carbon black with an Iodine Adsorption No. of less than 115 and the other of the pair is a small particle carbon black with an Iodine Adsorption No. of greater than 115. Excluded from the carbon black pairs are the extremely large thermal blacks such as N990 that have an Iodine Adsorption No. of 10 or less. The carbon black system also includes fumed silica and a silane coupler.

The carbon black pair is used with polar and nonpolar rubber. The nonpolar rubbers include natural rubber and styrene-butadiene rubber (SBR). Polar rubber such as nitrile rubber (NBR) is used. Different rubber stocks benefit from the carbon black system of the invention because the use of two mismatched pairs of carbon black can be varied to provide different desired characteristics to the rubber.

The fumed silica used with the carbon black pairs is commercially available and known to those skilled in the art. An example is a fumed colloidal silica made by Cabot Corporation, Boston Massachusetts and sold under the trademark Cab-O-Sil ®. The fumed silica is used with a silane coupler. Components of the carbon black system of this invention and other additives are measured by parts per weight of the rubber polymer used. The fumed silica is used in about 10 to about 20 parts per hundred of the selected rubber polymer. In the preferred embodiments the silane coupler used is bis,3, (triethoxysilyl)-propyl-tetrasulfide used with the fumed silica in a 10:1 ratio silica to silane coupler, however other silanes known in the art can be used.

The carbon blacks are mixed generally with neither of the pair exceeding the other in a 3:1 ratio with the preferred ratio of 2:1. The carbon blacks can be varied within the ratio to achieve the desired characteristics of the end rubber product. The carbon blacks are used in about 40 to about 80 parts per hundred per weight (phr) of rubber stock.

Additives known to those skilled in the art can be used with the carbon black system of this invention including antioxidants, antiozonants, processing oils, plasticizers and other additives known in the art. Also, cure systems known to those skilled in the art for the rubber stock selected are used in this invention.

Nitrile rubber is used for many industrial applications. The following Table 1 is a summary of characteristics for nitrile rubber stock with two carbon pairs exemplary of the invention. One of the pairs of the furnace carbon blacks is N231, which is a small particle black (Iodine Adsorption No. 121) with low structure (DBP No. 92) and the other is N774, which is a large particle black (Iodine Adsorption No. 29) with low structure (DBP No. 72). Another pair is a N234 which is a small particle black (Iodine Adsorption No. 120) with high structure (DBP No. 125) and N550 which is a large particle black (Iodine Adsorption No. 43) with high structure (DBP No. 121).

Table 1 summarizes data for modulus, set, tensile strength, elongation and tear strength for the carbon black pairs of this invention used with the fumed silica and silane coupler. The fumed silica was used in 15 parts per hundred weight of the selected rubber stock and the coupler was used in 1.5 parts per weight. Nitrile rubber stock was prepared with the mismatched pairs in varying ratios with the amount of each pair from 20 to 30 to 40 parts per hundred. Table 1 summarizes the properties of the nitrile rubber to illustrate the range of values for the rubber with the carbon black pairs of the invention.

A comparison of the carbon black pairs with different sizes to two sets of pairs matched for size as well as comparisons to individual carbon blacks used alone are shown in Table 1. The matched pairs of carbon black are similar in size but different in structure. For instance, N550 is a large particle black (Iodine Adsorption No. 43) with high structure (DBP No. 121) and N774 is a large particle black (Iodine Adsorption No. 29) with low structure (DBP No. 72). Another matched pair is N231 which is a small particle black (Iodine Adsorption No. 121) with low structure (DBP No. 92) and N234 which is a small particle black (Iodine Adsorption No. 120) with high structure (DBP No. 125). The matched carbon black pairs were used with the fumed silica or silane coupler. The matched carbon black pairs were prepared in varying ratios from 20 to 30 to 40 parts per hundred similar to the pairs with different size. Individual carbon blacks were also used at 60 parts per hundred of nitrile rubber with the fumed silica and silane coupler of the carbon black system of the present invention.

The rubber stocks in Table 1 were cured for thirty minutes with a sulfur cure.

that the carbon black producing the lower tensile strength predominates in a mixture. The data in columns 1 and 2 are contrary to this teaching and demonstrate the unique features of this invention.

As shown in Table 1, the use of the carbon black system of this invention can be used to produce rubber stock with desirable characteristics without loading the stock with excessive amounts of carbon black. The amount of the carbon black pairs can be varied to achieve the desired properties for the chosen application. The set values with an optimum of seven percent can be reached while at the same time attaining a modulus value ($M_{300}$) of 2200 psi without loading high amounts of carbon black. Also, elongation can decrease with carbon black loading and the use of the carbon black system of the present invention provides elonga-

TABLE 1

NITRILE RUBBER SUMMARY

| | Column No. | | | | | | | |
|---|---|---|---|---|---|---|---|---|
| Property | 1<br>N231[1]<br>N774 | 2<br>N234[2]<br>N550 | 3<br>N550[3]<br>N774 | 4<br>N231[4]<br>N234 | 5<br>N231<br>60 PHR | 6<br>N234<br>60 PHR | 7<br>N550<br>60 PHR | 8<br>N774<br>60 PHR |
| Modulus $M_{300}$ ASTM D412-75 psi | 1125–2430 | 1340–2930 | 1310–2710 | 1305–2925 | 1790 | 2180 | 2220 | 1630 |
| Set ASTM D412-75 Percent | 5.1–8.9 | 3.4–9.0 | 3.1–6.0 | 5.9–12.8 | 8.2 | 9.6 | 5.4 | 4.0 |
| Tensile Strength ASTM D412-75 psi | 3150–3820 | 3430–3960 | 3175–3545 | 3555–4420 | 3890 | 3805 | 3245 | 3145 |
| Elongation ASTM D412-75 Percent | 340–605 | 375–650 | 430–670 | 390–640 | 595 | 505 | 560 | 630 |
| Tear Strength Die C ASTM D624-73 pounds/inch | 300–325 | 230–260 | 225–230 | 250–270 | 275 | 255 | 245 | 245 |

[1]Carbon Black Pair N231 - small particle and low structure; N774 - large particle and low structure.
[2]Carbon Black Pair N234 - small particle and high structure; N550 - large particle and high structure.
[3]Matched Pair N550 large particle and high structure; N774 - large particle and low structure.
[4]Matched Pair N231 - small particle and low structure; N234 small particle and high structure.

Columns 1 and 2 of Table 1 present extreme data for the carbon black pairs N231/N774 and N234/N550. The columns 3 and 4 of Table 1 present data for the pairs N550/N774 and N231/N234 matched according to particle size. The range of carbon black loading in Table 1, columns 1–4 is 40 to 80 phr with 60 as the center point. Tables 2 and 3 contain complete data for nitrile rubber with the varied carbon black loading for the carbon black pairs N231/N774 and N234/N550. Columns 5–8 in Table 1 present data for each of the carbon blacks when used separately in nitrile rubber. The loading in columns 5–8 is 60 phr, the center point, and is at or near the loading required for maximum tensile strength.

As shown in Table 1, the range of properties for the pairs in columns 1 and 2 of the invention are similar to the ranges presented in columns 3–8, for matched pairs and individual carbon blacks. By comparing tensile strengths, it is obvious that large particle size carbon blacks represented by columns 3,7 and 8 produce lower tensile strength than do small particle size carbon blacks represented by columns 4, 5 and 6. Comparing columns 1 and 2 to these groups proves that carbon black pairs maintain higher tensile strengths. Traditional teaching is tion while maintaining the set values. The use of matched carbon black pairs tends to restrict the set values within a certain range with the large particle matched pair having a lower range of set values and the small particle matched pair having a higher range of set values. With the large particle carbon blacks, the set is lower than the desired seven percent. With the small particle carbon blacks the set is higher and can exceed desired values.

The properties for the nitrile rubber with varied ratios by weight of the pairs of carbon black with different particle sizes is shown below in Tables 2 and 3 to illustrate the flexibility of using only two carbon blacks to produce various types of rubber products.

TABLE 2

CARBON BLACK PAIRS - NITRILE RUBBER
N231 Small Particle Low Structure
N774 Large Particle Low Structure

| | N231/N774 parts per hundred (PHR) | | | | |
|---|---|---|---|---|---|
| Property | Col. 1<br>20/20 | Col. 2<br>40/20 | Col. 3<br>20/40 | Col. 4<br>40/40 | Col. 5<br>30/30 |
| Modulus $M_{300}$ | 1125 | 1775 | 1770 | 2430 | 1785 |

TABLE 2-continued

CARBON BLACK PAIRS - NITRILE RUBBER
N231 Small Particle Low Structure
N774 Large Particle Low Structure

| | N231/N774 parts per hundred (PHR) | | | | |
|---|---|---|---|---|---|
| Property | Col. 1 20/20 | Col. 2 40/20 | Col. 3 20/40 | Col. 4 40/40 | Col. 5 30/30 |
| ASTM D412-75 psi Set | 5.1 | 8.4 | 6.0 | 8.9 | 6.7 |
| ASTM D412-75 Percent Tensile Strength | 3660 | 3820 | 3615 | 3100 | 3690 |
| ASTM D412-75 psi Elongation | 605 | 530 | 560 | 340 | 565 |
| ASTM D412-75 Percent Tear Strength Die C ASTM D624-73 pounds/inch | 300 | 315 | 325 | 330 | 325 |

TABLE 3

CARBON BLACK PAIRS - NITRILE RUBBER
N234 Small Particle High Structure
N550 Large Particle High Structure

| | N234/N550 parts per hundred | | | | |
|---|---|---|---|---|---|
| Property | Col. 1 20/20 | Col. 2 40/20 | Col. 3 20/40 | Col. 4 40/40 | Col. 5 30/30 |
| Modulus $M_{300}$ | 1340 | 2075 | 2050 | 2930 | 2140 |
| ASTM D412-75 psi Set | 3.4 | 7.6 | 5.5 | 9.0 | 5.6 |
| ASTM D412-75 Percent Tensile strength | 3960 | 3735 | 3490 | 3430 | 3770 |
| ASTM D412-75 psi Elongation | 650 | 540 | 545 | 375 | 535 |
| ASTM D412-75 Percent Tear Strength Die C ASTM D624-73 pounds/inch | 255 | 260 | 245 | 230 | 245 |

Table 2 presents the detailed measurements for each loading level of the carbon black pair N231/N774 in nitrile rubber. The unique feature of Table 2 is the consistency of data for blends of N231 and N774 ranging from 40/20 to 20/40 as shown in columns 2, 3, and 5. Furthermore, within the ratios of carbon black pairs in cols. 2, 3 and 5 for N231:N774, the properties are uniform, especially tensile modulus, 1775, 1770, and 1785 psi respectively. N774 at 60 phr yields a tensile modulus of 1630 psi, and N231 at 60 phr yields a tensile modulus of 1790 psi. Ordinarily, one would expect the tensile modulus of a blend to be near an average for that of the individual carbon blacks, or at least proportionate. That the modulus should most closely approximate that yielded by the finer particle black is also unexpected.

Another unexpected result is in the permanent set. While N774 yields a desirable permanent set, the tensile is unacceptably low. N231 yields a desirable tensile, but the permanent set is unacceptably high. The blend shown in column 3, 20 phr N231 and 40 phr N774, yields an acceptable tensile and set. One would not anticipate the blend to yield both properties at acceptable levels, since the blend yielding even one optimal property is fortuitous. The remaining physical properties shown are well within normal and desirable ranges.

Referring to Table 1 it is observed that N774 yields tensile strength of 3145 psi, while N231 yields 3890 psi. Again, N774 yields a permanent set of 4.0%, while N231 yields 8.2%. All of these observations are typical, that is the small particle black, N231, yields high tensile and high permanent set, while the large particle black, N774, yields lower tensile strength and permanent set. In these examples N231 and N774 are used at 60 phr respectively, an amount near what is required for maximum tensile strength.

Referring to Table 2, columns 2, 3 and 5 combinations of N774 and N231 which total 60 phr, show an interesting and unpredictable result. The tensile strengths of the 3 compounds are 3820, 3615 and 3690, results which are, within acceptable experimental error, the same. This tensile strength is also significantly higher than that for N774, (3145 psi) while being much closer to that for N231 (3890 psi). In general, tensile strength should follow the pattern of the largest sized particle since the failure should occur at a site occupied by a large particle before failing at a site occupied by a small particle.

Referring to Table 1, 60 phr of N234 yields a tensile strength of 3805 psi in the nitrile rubber of this example. N550 at 60 phr yields a tensile strength of 3245 psi, which is significantly lower than that yielded by N234. Similarly, N550 yields a permanent set of 5.4% while N234 yields 9.6%. It is unusual that both carbon blacks at 60 phr yield the same tensile modulus, within an accepted range of experimental error, ie., 2180 and 2220 psi.

Referring to Table 3 column 5, a blend of 30 phr N550 and 30 phr N234 in the nitrile compound yields a tensile of 3770 psi, a result within accepted experimental error of that yielded by 60 phr N234, ie., 3805 psi. As previously discussed, such a result is totally unexpected since tensile failure ought to follow the pattern of the largest particle.

Comparing the permanent set value in column 5, ie. 5.6% to those yielded by N550 and N234 respectively, 5.4% and 9.6%, another unanticipated result is observed. Permanent set is the obverse of resilience, that is the lower the set, the more resilient the compound. In theory, large particle blacks do not entangle polymer molecules to the extent that small particle carbon blacks will entangle the polymer molecules. Therefore, large particle carbon blacks produce low set, or more resilient, compounds. At best a blend might produce an average set, in this case 7.5%, the arithmetic average of 5.4% and 9.6%. Instead a set of 5.6% is achieved; a truly unexpected result.

Comparing the tensile modulus values in columns 2, 3 and 5 of Table 3 with those in columns 2, 3 and 5 of Table 2, it is observed that the N234/N550 pair yields a higher tensile modulus than the N231/N774 pair, ie., approximately 2050 psi versus 1770 psi, a significant difference. This result is expected since both N234 and N550 are high structure carbon blacks. What is unexpected is that N234/N550 yields permanent set values lower than or equivalent to N231, and N774 pairs. Referring to Table 1 shows immediately that the high structure carbon blacks produce higher sets than the low structure blacks of the same particle size. This result allows high tensile modulus stacks with low set, or high resilience to be produced.

Again it is to be noted that the balance of properties shown in Table 3 are within normal and desirable ranges for rubber compounding.

The carbon black pairs of this invention can also be used with nonpolar rubbers such as natural rubber and styrene-butadiene rubber (SBR). The nonpolar rubbers are cured with sulfur cure systems typically utilized by those skilled in the art. Table 4 is an example of a nonpolar rubber, in this instance SBR, prepared with a pair of carbon blacks of this invention. The rubber stock was cured for 30 minutes. The carbon black pair N234/N550 had high structure with the mixture of sizes. Various ratios of the carbon blacks were used with SBR as shown columns 1 through 5 in Table 4.

TABLE 4

CARBON BLACK PAIRS - SBR RUBBER
N234 Small Particle High Structure
N550 Large Particle High Structure

| Property | N234/N550 parts per hundred | | | | |
|---|---|---|---|---|---|
| | Col. 1 20/20 | Col. 2 40/20 | Col. 3 20/40 | Col. 4 40/40 | Col. 5 30/30 |
| Modulus $M_{300}$ ASTM D412-75 psi | 815 | 1400 | 1360 | 1890 | 1320 |
| Set ASTM D412-75 Percent | 6.4 | 9.6 | 8.1 | 13.9 | 8.3 |
| Tensile strength ASTM D412-75 psi | 2585 | 2640 | 2565 | 2430 | 2660 |
| Elongation ASTM D412-75 Percent | 720 | 545 | 590 | 430 | 595 |
| Tear Strength Die C ASTM D624-73 pounds/inch | 300 | 310 | 325 | 260 | 300 |

SBR is typically loaded with carbon black to attain mechanical properties present in nonpolar natural rubber. Those skilled in the art recognized that 60 phr carbon black is a typical carbon black loading for SBR. Columns 2, 3 and of Table 4 present data for SBR loaded with 60 phr of the carbon black pair at various ratios one to another. Comparisons of the data show that at 60 phr loading of carbon black, the tensile strength of the rubber are essentially independent of the ratio of the carbon blacks. These results allow the compounds to use high amounts of less costly N550 carbon black. This illustrates one feature of the invention which is cost efficiency in rubber production.

The invention is exemplified by the formulations presented herein. It is not intended to restrict the claims, practice or the scope of this inventions to the examples or formulations specifically set forth. Those skilled in the art may practice and understand the invention according to the disclosure and are not limited by the specific discussion or examples provided.

We claim:

1. A carbon black system for rubber manufacture comprising
   a pair of carbon blacks;
   both of said pair of carbon blacks having the same structure;
   one of said pair of carbon blacks having a particle size with an Iodine Adsorption No. of less than 115 and the other of said pair having a particle size with an Iodine Adsorption No. of greater than 115;
   a fumed silica; and
   a silane coupler.

2. A carbon black system of claim 1 wherein the ratio of either one of said pair of carbon blacks to the other in the mixture does not exceed 3:1.

3. A carbon black system of claim 1 wherein the fumed silica is 12.5% to 50% by weight of the combined weight of the carbon black pair.

4. A rubber composition comprising
   a rubber selected from the group of polar and nonpolar rubbers;
   a carbon black system comprising a mixture of a pair of furnace carbon blacks;
   both of said pair of carbon blacks having the same structure;
   one of said pair of carbon blacks having a particle size with an Iodine Adsorption No. of less than 115 and the other of said pair having a particle size with an Iodine Adsorption No. of greater than 115;
   a fumed silica; and
   a silane coupler.

5. A rubber composition of claim 4 wherein the ratio of either one of said pair of carbon blacks to the other in the mixture does not exceed 3:1.

6. A rubber composition of claim 4 wherein the carbon black system is from about 40 parts per hundred to about 80 parts per hundred of the rubber.

7. A rubber composition of claim 4 wherein said fumed silica is from about 10 parts per hundred to about 20 parts per hundred of the rubber.

8. A rubber composition of claim 4 wherein said nonpolar rubber is selected from the group of styrene-butadiene rubber and natural rubber.

9. A rubber composition of claim 4 wherein said polar rubber is nitrile rubber.

10. A rubber composition of claim 4 wherein the carbon black system comprises a mixture of N231 and N774 wherein the ratio of either one of said carbon blacks to the other does not exceed 3:1.

11. A rubber composition of claim 4 wherein the carbon black system comprises a mixture of N234 and N550 wherein the ratio of either one of said carbon blacks to the other does not exceed 3:1.

* * * * *